United States Patent
Nares Ochoa et al.

(10) Patent No.: US 9,464,239 B2
(45) Date of Patent: Oct. 11, 2016

(54) IONIC LIQUID CATALYST FOR IMPROVEMENT OF HEAVY AND EXTRA HEAVY CRUDE

(75) Inventors: Rubén Nares Ochoa, México, D.F. (MX); Persi Schacht Hernández, México, D.F. (MX); María del Carmen Cabrera Reyes, México, D.F. (MX); Marco Antonio Ramírez Garnica, México, D.F. (MX); Fernando Castrejón Vacío, México, D.F. (MX); Ricardo Jesús Ramírez López, México, D.F. (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 1224 days.

(21) Appl. No.: 12/668,735

(22) PCT Filed: Jul. 7, 2008

(86) PCT No.: PCT/MX2008/000086
§ 371 (c)(1),
(2), (4) Date: Mar. 24, 2010

(87) PCT Pub. No.: WO2009/011559
PCT Pub. Date: Jan. 22, 2009

(65) Prior Publication Data
US 2010/0193401 A1      Aug. 5, 2010

(30) Foreign Application Priority Data

Jul. 13, 2007    (MX) .................... MX/a/2007/008524

(51) Int. Cl.
| | |
|---|---|
| *B01J 27/19* | (2006.01) |
| *B01J 23/881* | (2006.01) |
| *C10G 47/02* | (2006.01) |
| *C10G 45/62* | (2006.01) |
| *B01J 27/053* | (2006.01) |
| *B01J 35/12* | (2006.01) |
| *C10G 65/04* | (2006.01) |
| *C10G 65/10* | (2006.01) |
| *C10G 65/12* | (2006.01) |
| *B01J 23/88* | (2006.01) |

(52) U.S. Cl.
CPC .............. *C10G 45/62* (2013.01); *B01J 27/053* (2013.01); *B01J 27/19* (2013.01); *B01J 35/12* (2013.01); *C10G 65/043* (2013.01); *C10G 65/10* (2013.01); *C10G 65/12* (2013.01); *B01J 23/88* (2013.01)

(58) Field of Classification Search
CPC ........ B01J 27/19; B01J 23/881; C10G 47/02
See application file for complete search history.

(56) References Cited

U.S. PATENT DOCUMENTS

| | | | |
|---|---|---|---|
| 3,862,961 A | * | 1/1975 | Sheng et al. ................. 549/529 |
| 4,077,867 A | | 3/1978 | Aldridge et al. |
| 4,134,825 A | | 1/1979 | Bearden, Jr. et al. |
| 4,136,013 A | | 1/1979 | Moll et al. |
| 4,486,293 A | | 12/1984 | Garg |
| 5,168,088 A | | 12/1992 | Utz et al. |
| 5,731,101 A | | 3/1998 | Sherif et al. |
| 5,871,638 A | | 2/1999 | Pradhan et al. |
| 6,139,723 A | | 10/2000 | Pelrine et al. |
| 6,160,193 A | | 12/2000 | Gore |
| 6,274,026 B1 | | 8/2001 | Schucker et al. |
| 6,274,031 B1 | | 8/2001 | Khare et al. |
| 6,969,693 B2 | | 11/2005 | Sauvage et al. |
| 7,001,504 B2 | | 2/2006 | Schoonover |
| 7,678,732 B2 | * | 3/2010 | Chen et al. ................... 502/220 |

OTHER PUBLICATIONS

Nares, H.R. et al., Heauy crude oil upgrading with transition metals, SPE 107837, (2007).
Nares, H.R. et al., Heavy oil upgrading through the use of ionic-liquid, SPE 108676, (2007).
Society of Petroleum Engineers, 2007 SPE Workshop, Offshore/onshore heavy oil operations.

* cited by examiner

*Primary Examiner* — Randy Boyer
(74) *Attorney, Agent, or Firm* — Dickinson Wright PLLC

(57) ABSTRACT

The present invention relates to improving heavy crude oil, and extra through a scheme considering the use of ionic liquids catalysts based on Mo and Fe catalyst is highly miscible with crude oil and are in the homogeneous phase crude oil.

Furthermore, this invention relates to improving heavy crude in two stages, the first ionic liquid catalyst, and the second supported catalyst. The API gravity crude is increased from 12.5 to 19 points in the first stage and viscosities up to 5600-1600 decreased from 60-40 cSt certain to 37.8° C. While in the second stage, you get an upgraded crude oil with 32.9° API, viscosity of 4.0 cSt, reduction in total sulphur content of 0.85 wt % nitrogen and 0295 ppm by weight, respectively. As a considerable reduction of asphaltenes from 28.65 to 3.7% weight.

23 Claims, 1 Drawing Sheet

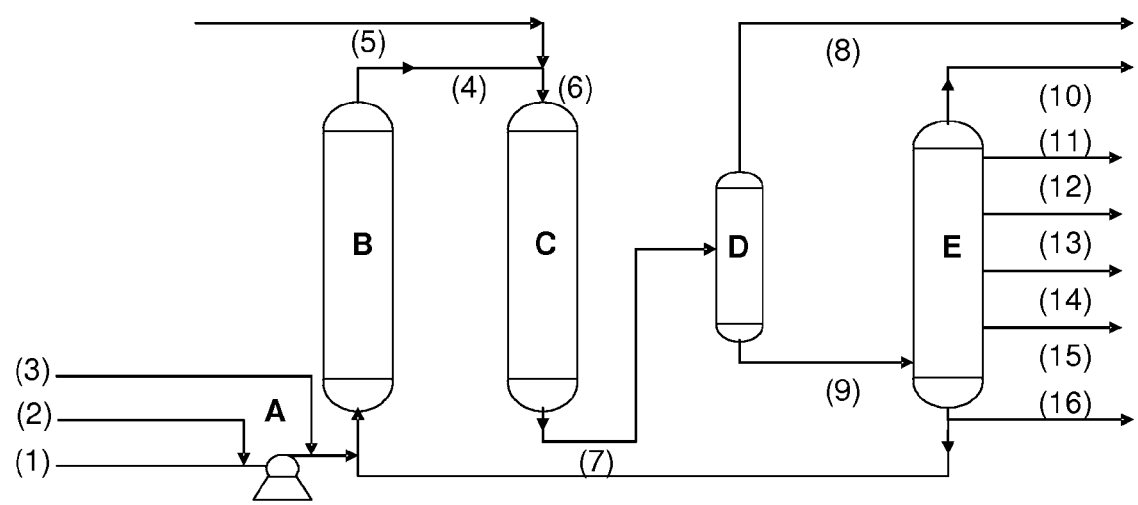

US 9,464,239 B2

IONIC LIQUID CATALYST FOR IMPROVEMENT OF HEAVY AND EXTRA HEAVY CRUDE

TECHNICAL FIELD OF THE INVENTION

The present invention relates to an ionic liquid catalyst for improving and extra heavy crude oil through hydrocracking and hydrogenation reactions of molecules of asphaltenes and resins.

The ionic liquid catalyst is produced by dissolving in water, an iron salt such as ferric sulphate ($Fe_2O_3$), which is changed during the preparation $(SO_4)^{2-}$ and promoted with metals of Group VI B and VIII B the periodic table.

BACKGROUND OF THE INVENTION

In coming years, some of the untapped natural resources shall consist mainly of heavy crude oil, this implies that the oil industry needed to develop processes for secondary and tertiary recovery more efficient, so that the development and implementation of new operating alternatives to increase the productivity index of sites and improve the transportation of crude oil to refining canters, are important aspects to keep production levels demanded fuel and thus fulfill the commitments of refining and export of hydrocarbons. The heavy crude oil deposits are difficult to exploit because they have high resistance to flow (high viscosity) and low yield of distillable fraction (<538° C.), additionally, the existence of penalties in oil with high concentrations of metals, decreasing profit margins. In this regard, it is important to note that there are different technologies to improve the quality of heavy oil in the reservoir and allow recovery of crude oil, noting among the most important steam injection, cyclic steam injection, steam drained by gravity assisted aquathermolysis, air injection, in-situ combustion and conventional in-situ combustion through intelligent wells. Conventional crude than 20° to 32° API is extracted from the reservoir by artificial systems of production and secondary recovery methods. However, in the case of heavy oil from 4 to 13° API, it is possible to extract with good recovery factor using conventional techniques currently in use, making it necessary to employ more sophisticated extraction schemes to increase significantly the recovery factor and also meet the committed quality oil export contracts in the medium and long term.

Applicants know that there are several studies to improve the quality of heavy oil and extra-heavy deposits (in situ) using hydrogen donor additives. Similarly, it is known that other studies have been used in numerous fields of observation citing as an example: in-situ combustion with injection of an oxidant gas (air or oxygen-enriched air) to generate heat allows combustion in the reservoir. This scheme does increase the quality of oil between 6 and 12° API, and therefore intended to be applied as a base, because such studies could represent an alternative to improve the quality of crude oil under conditions of lower risk and investment costs lower compared to those required in oil hydrotreating scheme on the surface at high severity (high pressure, low temperature and space velocity), since it would build the conditions of pressure and temperature fields. Furthermore, ionic liquids have been developed that operate under the scheme of process to break chains of high molecular weight hydrocarbons by free radical or ionic mechanisms under conditions of reservoir pressure and temperature.

Regarding the above, then provided the following references are found within the prior art to date:

The U.S. Pat. No. 6,274,031 refers to a technology for the adsorption of sulphur compounds in fluidized bed, in particular hydrogen sulphide dissolved in the oil, using a fluidized adsorbent material based on alumina, silica, zinc oxide and a metal oxide highly dispersed, we do note that differs from the present invention, under which no longer uses an ionic liquid catalyst and no chemical reactions take place, but only a process of adsorption of sulphur.

The U.S. Pat. No. 6,160,193 refers to a process of oxidation of sulphur compounds using oxidizing agents such as acetic acid, followed by extraction with a solvent immiscible and differ, therefore the present invention, by not using a liquid catalyst ion.

The U.S. Pat. No. 6,274,026 refers to the polymerization of sulphur compounds in an electrochemical cell using an ionic liquid as the electrolyte, and does not mention the use of an ionic liquid catalyst based on iron-molybdenum in the presence of a hydrogenating atmosphere, such and as used in this invention.

The U.S. Pat. No. 7,001,504 refers to the use of ionic liquids for extraction of organ sulphur compounds are extracted by direct or partial oxidation of sulphur compounds to sulphoxides or sulphones to increase its solubility in the ionic liquid. In the present invention uses an ionic liquid catalyst in the presence of hydrogen to promote cracking and hydrogenation reactions.

The U.S. Pat. No. 6,969,693 refers to use of ionic liquids immobilized on a carrier as a catalyst in Friedel Crafts reactions, especially in alkylation reactions. The present invention uses an ionic liquid catalyst highly dispersed in the hydrocarbon to hydrocracking and hydrogenation reactions.

The U.S. Pat. No. 5,731,101 refers to the use of ionic liquids from metal halide salts and hydro halogen alkyl amines for production of linear alkyl benzene. The present invention uses an ionic liquid catalyst based on iron-molybdenum for hydrogenation reactions and hydrocracking in crude oil.

The U.S. Pat. No. 6,139,723 refers to the use-based ionic liquids for use in Fe bitumen and waste.

The U.S. Pat. No. 4,136,013 refers to a catalyst in the form of homogenized suspension of Fe, Ti, Ni and V for the hydrogenation reaction of crude oil and debris. The present invention uses a catalyst based ionic liquid iron-molybdenum.

The U.S. Pat. No. 4,077,867 and U.S. Pat. No. 4,134,825 relate to the hydroconversion of coke and heavy crude oil with catalysts naphthenates Mo. The present invention uses an ionic liquid catalyst based on iron-molybdenum in aqueous solution.

The U.S. Pat. No. 4,486,293 uses a catalyst of Fe in combination with a metal of Group VI or Group VIII from organic salts of these metals for the liquefaction of coke with a hydrogen donor plus a salt water solution. However, the catalyst is first soaked in coke reaction prior to liquefaction. In the present invention, the ionic liquid catalyst is prepared from inorganic salts of iron and molybdenum, and subsequently dispersed into the crude oil is not saturated.

The U.S. Pat. No. 5,168,088 refers to the use of a slurry phase catalyst for the liquefaction of coke through the iron oxide precipitation in the matrix of coke. In the present invention, the ionic liquid catalyst is prepared from inorganic salts of iron and molybdenum that are dispersed in crude oil and is not precipitated.

The above known technology are overcome by the applicant under that through the application of ionic liquid catalyst of the present invention significantly improve the physical and chemical properties of heavy crude oils and vacuum residues.

The present invention is related to optimize the quality of heavy and extra heavy crude oil by injecting an ionic liquid catalyst to improve the API gravity and reducing its viscosity in the reservoir (in-situ), taking place hydroconversion reactions of asphaltenes and resins in higher value added products (gasoline, middle distillates and diesel cargo FCC) and the reduction in content of sulphur and nitrogen compounds.

It is therefore an object of the present invention provide a catalyst in the form of ionic liquid to improve the properties of heavy crude oil in the reservoir.

Another object of this invention is to provide a catalyst in the form of ionic liquid to improve the properties of heavy vacuum residue Another object of this invention is to propose the use of an ionic liquid catalyst to oil field (in-situ).

Further, another object of this invention is to present the use of an ionic liquid catalyst in a two-step process that takes place with strict controls on the addition of it under certain conditions, which allow obtaining crude oils with lower viscosity and higher API gravity.

BRIEF DESCRIPTION OF THE DRAWINGS OF THE INVENTION

With the aim of greater understanding in the use of ionic liquid catalyst obtained in the present invention, then we will refer to FIG. 1 which is attached:

In FIG. 1 shows the schematic diagram of a process hydrocracking/hydrogenation steps, which used ionic liquid catalyst obtained in the present invention for improving and extra heavy crude oil.

Although the scheme of FIG. 1 illustrates specific equipment with which you can implement this invention, should not be construed to limit the invention to a specific computer.

DETAILED DESCRIPTION OF THE INVENTION

The present invention relates to an ionic liquid catalyst, the synthesis and application in the improvement of heavy and extra heavy crude oil using a catalyst system which conducted hydrocracking and hydrogenation reactions in a cyclical process and within the reservoir.

The synthesis of ionic liquid catalyst preparation, the object of the present invention is carried out in a procedure, such that the ionic liquid catalyst is prepared in an aqueous base, using inorganic salts of a Group VIII metal, as iron, particularly ferric sulphate and inorganic salts of a Group VIA metal such as molybdenum to obtain an ionic liquid, in which both the iron, molybdenum are part of the ionic liquid catalyst.

The chemical state of each constituent element of the catalyst is very complicated and not fully elucidated. However, it is known that molybdenum and phosphorus are forming a heteropolyacid compound and the ammonium group is forming heteropolyacid salt, so that the ion phosphomolybdate $(PMo_{12}O_{40})^{-3}$ behaves as an anion and the ammonium group as a cation and it is also possible the presence of iron as $(Fe^{+3})$ and the sulfate ion $(SO_4^{-2})$ as anionic counterpart in the ionic liquid catalyst.

The catalyst obtained has high catalytic activity in hydrogenation reactions hydrocracking and heavy crude oil at temperatures between 250-420° C. and pressures from 50 to 125 Kg/cm² and is used in the first stage of the process for upgrading heavy crude oil and extra in the present invention (FIG. 1).

Preparation of Ionic Liquid Catalyst.

The preparation of ionic liquid catalyst of the present invention contemplates two steps, the first solubilize the ammonium molybdate and phosphoric acid in water at conditions of temperatures between 15 and 60° C., preferably between 25 and 40° C., with stirring, until a perfectly clear solution. In the second step, ferric sulphate is incorporated and is solubilized at a temperature between 50 and 80° C., preferably between 60 and 70° C., to obtain a solution of ionic liquid catalyst that can be used and activated directly in the process of hydrocracking-hydrogenation, or may be previously activated in a hydrogen atmosphere at temperatures between 200 and 350° C., preferably between 250 and 300° C. It follows that the ionic liquid catalyst, molybdenum and phosphorus are forming a heteropoly acid compound and the ammonium group is forming heteropoly acid salt so that the ion phosphomolybdate $(PMo_{12}O_{40})^{-3}$ behaves as an anion and the group ammonium as a cation and it is also possible the presence of iron as a cation $(Fe^{+3})$ and the sulphate ion $(SO_4^{-2})$ as anionic counterpart in the ionic liquid catalyst. The catalyst of the present invention reported high catalytic activity in hydrogenation reactions hydrocracking and heavy crude oil at temperatures between 250-420° C. and pressures from 50 to 125 Kg/cm².

Description of the Process Using the Ionic Liquid Catalyst.

In the present invention uses a two-stage catalytic process to improve the properties of heavy and extra heavy crude oils successfully through hydrocracking reactions and hydrogenation of asphaltene and resin molecules. Referring to FIG. 1, the ionic liquid catalyst and crude oil are mixed and homogenized in pre-feed pump (A) at a temperature between 200-300° C., preferably 270° C., before entering the reactor packed with a high-efficiency static switch that contains several items of mixed assemblies (B), so they are each other at an angle of 90°. Next, the crude oil (1) and ionic liquid catalyst (2) pre-activated homogenized and mixed with a stream of hydrogen (3) in the temperature range between 350-450° C., preferably 400° C. At this early stage, the reaction hydrocracking/hydrogenation of asphaltenes and resins is carried out at 250-420° C. and pressure 50 to 125 Kg/cm² for a residence time of reaction 2 to 20 hours.

After exiting the first reactor (4), increases the API gravity crude oil from 10-12.5 to 19-21 due to the reactions of asphaltene and resins hydrocracking. The products obtained in this first stage have a removal of sulphur from 30 to 45% weight and the viscosity is drastically reduced. Moreover, there is a change in the molecular composition seeing reflected by the increase of paraffin and aromatic compounds due to the conversion of the resins and asphaltenes.

The reaction products of the first phase (4), then mixed with a stream of hydrogen (5) and fed to a second stage of reaction (6) comprises a fixed bed reactor packed with a catalyst based multimetallic NiCoMoWP supported on alumina and/or amorphous silico-aluminate and/or crystal (D) in concentrations from 5 to 15% by weight with respect to oil to treat a temperature between 250-420° C. and pressures between 50 and 125 Kg/cm², for a residence time of reaction 2 to 30 hours.

In this second phase are carried out reactions hydrocracking, hydrodesulfurization and hydrogenation of some aromatic compounds, i.e., takes place, the conversion of resins and asphaltenes to lower molecular weight structures, guiding their selectivity to lower molecular weight hydrocarbons (gasoline, middle distillates and diesel cargo FCC), further improving the quality of crude oil increased API gravity between 27 and 32°, kinematics viscosity reduction and removal of sulphur compounds and metals.

The reaction products (7) of this last stage are sent to a high pressure separator (E) in which the final product is obtained as sour gas (8) and light crude oil with API gravity between 27 and 30 (9). U.S. light crude passed to a gas plant for L. Combined P. (10), petrol (11), middle distillates (12), (13), light diesel oil (14), diesel cargo FCC (15) and residue (16), which can be recirculated to the first reactor, and either in its entirety or a portion. The processing scheme of the present invention considers recycle the residue from the second reactor to the first partial or total. The physical and chemical properties of charges and income are shown in Example 10.

Additionally, it is mentioned that the present invention considers the ionic liquid catalyst is applicable to deposits allowing intelligent horizontal increase the recovery factor of crude oils and thus achieving planned production targets mainly in the fields and extra heavy crude-heavy, increase the API gravity, viscosity reducing, removing sulphur and nitrogen compounds from heavy crude oils and extra-heavy in the reservoir, which will facilitate its exploitation and transportation by reducing the content of resins and asphaltenes, transforming them to oil light of higher added value.

EXAMPLES

Below are examples related to the ionic liquid catalyst, their synthesis and their use, objects of the present invention, described above, without limiting their scope.

Example 1

The burden was heavy oil used KU-H East region of Campeche, Mexico, its properties are listed in Table 1. Also, the ionic liquid catalyst was prepared as described above:

In a batch reactor with a capacity of 500 ml were placed 150 g of crude KU-H and 7.5 g of ionic liquid catalyst made from 0.5% by weight Fe and 0.3 wt % Mo, homogeneously mixed with pressurized hydrogen to 28 Kg/cm². Increased ambient temperature to 350° C. reaching 75 Kg/cm² pressure in the system. Once stabilized the above conditions the reaction time was 72 hours. Table 1 shows the viscosities of the load and hydrotreated product, noting that under the conditions of previous hydroconversion crude KU-H decreased significantly its viscosity and increasing its API gravity of 13.5° to 20.2°.

Through the hydrotreating catalyst with ionic liquid based on weight of 0.5% Fe and 0.3 wt % Mo, there is an increase in saturated and aromatic hydrocarbons at the expense of conversion of resins and asphaltenes, which reduced from 16.81 to 13.8 and 28.65 to 10.82 wt %, respectively. Also notable is the reduction of sulphur from 5.14 to 2.6% weight, so that there is a clearance approximately 70% weight. The total nitrogen was reduced from 780 to 633 ppm by weight, equivalent to a 32% weight denitrogenation.

Example 2

The burden was heavy oil used KU-H East region of Campeche, Mexico, its properties are listed in Table 2.

In a batch reactor with a capacity of 500 ml were placed 150 g of crude KU-H and 7.5 g of an ionic liquid-based catalyst of 0.5 wt % Fe and 0.2 wt % Mo were mixed evenly pressurized hydrogen 28 Kg/cm². Increased ambient temperature to 350° C. reaching 75 Kg/cm² pressure in the system. Once stabilized the above conditions the residence time of reaction was 72 hours.

Table 2 shows the properties of crude oil KU-H, product loading and hydrotreated at 350° C. with the ionic liquid catalyst prototype Through the hydrotreating with the ionic liquid catalyst had an increase in API gravity of 7 units, the viscosity decreased significantly to values less than 385 cSt. The sulphur removal was 27% weight (5.13 to 3.7 wt %).

TABLE 1

Properties KU-H crude oil, freight and hydrotreated product with the ionic liquid-based catalyst of 0.5 wt % Fe and 0.3 wt % Mo.

| Properties | | Feed | Product |
|---|---|---|---|
| Specific Gravity, ° API | | 13.5 | 20.2 |
| Viscosity, cSt | 15.6° C. | 16,273 | 136.63 |
| | 25° C. | 5,400 | 100.62 |
| | 37.8° C. | 1,444 | 68.15 |
| Total sulphur, wt % | | 5.14 | 2.6 |
| Total nitrogen, ppm weight | | 750 | 633 |
| SARA, wt % | Saturates | 12.73 | 29.75 |
| | Polar | 16.81 | 13.8 |
| | Aromatic | 41.81 | 45.63 |
| | Asphaltene | 28.65 | 10.82 |

Example 3

The burden was heavy oil used KU-H East region of Campeche, Mexico, its properties are listed in Table 1.

In a batch reactor with a capacity of 500 ml, were placed 150 g of crude KU-M, were added 7.5 g of weight a basic ionic liquid catalyst of 0.5 wt % Fe and 0.3 wt % Mo, at room 20-25° C. The reaction was carried at 350° C. and 100 kg/cm² for 15 hours. The results obtained are shown in Table 3.

TABLE 2

Properties KU-H crude oil, distillate with a base ionic liquid catalyst of 0.5 wt % Fe and 0.2 wt % Mo.

| Properties | | Product |
|---|---|---|
| Specific Gravity, ° API | | 19.6 |
| Viscosity, cSt | 15.6° C. | 84.3 |
| | 25° C. | 59.59 |
| | 37.8° C. | 38.94 |
| Total sulphur, wt % | | 3.7 |
| Total nitrogen, ppm weight | | 690 |
| SARA, wt % | Saturates | 18.54 |
| | Polar | 16.64 |
| | Aromatic | 48.43 |
| | Asphaltene | 16.39 |

Example 4

The burden was heavy oil used KU-H East region of Campeche, Mexico, its properties are listed in Table 1.

In a batch reactor with a capacity of 500 ml, were placed 150 g of crude KU-M, were added 7.5 g of weight a basic ionic liquid catalyst of 0.5 wt % Fe and 0.3 wt % Mo, at room 20-25° C. The reaction was carried at 350° C. and 100 kg/cm² for 24 hours. The results obtained are shown in Table 4.

Example 5

The burden was heavy oil used KU-H East region of Campeche, Mexico, its properties are listed in Table 1.

In a batch reactor with a capacity of 500 ml, were placed 150 g of crude KU-M, were added 7.1 g of weight a basic ionic liquid catalyst of 0.5 wt % Fe and 0.2 wt % Mo, at room 20-25° C. The reaction was carried at 350° C. and 100 Kg/cm² for 48 hours. The results obtained are shown in Table 5.

TABLE 3

Properties of crude oil KU-H-treated product-based ionic liquid catalyst of 0.5 wt % Fe and 0.3 wt % Mo.

| | | |
|---|---|---|
| Increase in Specific Gravity, ° API | | 13.5-17.0 |
| Sulphur, % Weight | | 3.3 |
| Nitrogen, wt % | | 380 |
| Viscosity, cSt | at 15.6° C. | 391.0 |
| | at 25° C. | 278.3 |
| | at 37.8° C. | 16.54 |

TABLE 4

Properties of the crude oil KU-H-treated product-based ionic liquid catalyst of 0.5 wt % Fe and 0.3 wt % Mo.

| | | |
|---|---|---|
| Increase in Specific Gravity, ° API | | 13.5-17.7 |
| Sulphur, % Weight | | 3.8 |
| Nitrogen, wt % | | 395 |
| Viscosity, cSt | a 15.6° C. | 499 |
| | a 25° C. | 263 |
| | a 37.8° C. | 124 |

Example 6

The burden was heavy oil used KU-H East region of Campeche, Mexico, its properties are listed in Table 1.

In a batch reactor with a capacity of 500 ml, were placed 200 g of crude KU-M, were added 8.3 g of weight a basic ionic liquid catalyst of 0.5 wt % Fe and 0.3 wt % Mo, at room 20-25° C. The reaction was carried at 350° C. and 100 kg/cm² for 48 hours. The results obtained are shown in Table 6.

TABLE 5

Properties of the crude oil KU-H-treated product-based ionic liquid catalyst of 0.5 wt % Fe and 0.2 wt % Mo.

| | | |
|---|---|---|
| Increase in Specific Gravity, ° API | | 13.5-17 |
| Sulphur, % Weight | | 3.7 |
| Nitrogen, wt % | | 390 |
| Viscosity, cSt | a 15.6° C. | 375 |
| | a 25° C. | 166 |
| | a 37.8° C. | 101 |

Example 7

The load used was extra heavy crude oil in the marine area of the Gulf of Mexico, its properties are listed in Table 7.

In a batch reactor with a capacity of 100 ml, were placed 55 g of extra heavy crude oil, were added 2 g of ionic liquid based on weight of 0.5% Fe and 0.3 wt % Mo, at a temperature of 20-25° C. The reaction was carried at 400° C. and 150 kg/cm² for 4 hours. The results obtained are shown in Table 7.

TABLE 6

Properties of crude oil KU-H-treated product-based ionic liquid catalyst of 0.5 wt % Fe and 0.3 wt % Mo.

| Properties | | Product |
|---|---|---|
| Increase in Specific Gravity, ° API | | 18 |
| Viscosity, cSt | 15.6° C. | 298 |
| | 25° C. | 156 |
| | 37.8° C. | 79 |
| Total sulphur, wt % | | 3.2 |
| Total nitrogen, ppm weight | | 390 |
| SARA, wt % | Saturates | 24.0 |
| | Polar | 15.86 |
| | Aromatic | 48.04 |
| | Asphaltene | 12.10 |

TABLE 7

Extra heavy crude oil properties (charge) and hydrotreated product with the ionic liquid-based catalyst of 0.5 wt % Fe and 0.3 wt % Mo.

| Properties | | Loading | Product |
|---|---|---|---|
| Specific Gravity, ° API | | 3.0 | 9.0 |
| Viscosity, cSt | 25° C. | 1145.76 | — |
| | 37.8° C. | 488.19 | 3998 |
| | 121° C. | 3053.25 | 1005 |
| Total sulphur, wt % | | 4.64 | 3.26 |
| Total nitrogen, ppm weight | | 4780 | 3814 |
| Insoluble in n-heptane wt % | | 20.87 | 13.45 |
| SARA, wt % | Saturates | 13.16 | 25.44 |
| | Polar | 24.48 | 15.27 |
| | Aromatic | 25.64 | 36.64 |
| | Asphaltene | 36.72 | 22.65 |

Example 8

In a batch reactor with a capacity of 100 ml, were placed 55 g of extra heavy crude oil, were added 2 g of ionic liquid based on weight of 0.5% Fe and 0.3 wt % Mo, at a temperature of 20-25° C. The reaction was carried at 400° C. and 100 kg/cm² for 2 hours. The results obtained are shown in Table 8.

TABLE 8

Properties of extra heavy crude oil with distillate-based ionic liquid catalyst of 0.5 wt % Fe and 0.3 wt % Mo.

| Properties | | Product |
|---|---|---|
| Specific Gravity, ° API | | 7.0 |
| Viscosity, cSt | 25° C. | 3999 |
| | 37.8° C. | 812.46 |
| | 50° C. | 310 |
| Total sulphur, wt % | | 3.86 |
| Total nitrogen, ppm weight | | 4272 |
| Insoluble in n-heptane wt % | | 20.14 |
| SARA, wt % | Saturates | 31.96 |
| | Polar | 19.84 |
| | Aromatic | 18.85 |
| | Asphaltene | 29.35 |

Example 9

In a batch reactor with a capacity of 100 ml, were placed 55 g of extra heavy crude oil, were added 2 g of ionic liquid based on weight of 0.5% Fe and 0.3 wt % Mo, at a temperature of 20-25° C. The reaction was carried at 400° C. and 100 kg/cm² for 6 hours. The results obtained are shown in Table 9.

TABLE 9

Properties of extra heavy crude oil with distillate-based ionic liquid catalyst of 0.5 wt % Fe and 0.3 wt % Mo.

| Properties | | Product |
|---|---|---|
| Specific Gravity, ° API | | 11 |
| Viscosity, cSt | 25° C. | 3900 |
| | 37.8° C. | 800. |
| | 50° C. | 285 |
| Total sulphur, wt % | | 3.86 |
| Total nitrogen, ppm weight | | 4272 |
| Insoluble in n-heptane wt % | | 22.97 |
| SARA, wt % | Saturates | 27.96 |
| | Polar | 18.84 |
| | Aromatic | 15.85 |
| | Asphaltene | 26.29 |

Example 10

The burden was heavy oil used KU-H East region of Campeche, Mexico, its properties are listed in Table 2.

In a pilot plant in two phases each with a capacity of 500 ml, was carried out to improve crude oil. Initially 7.5 g of ionic liquid catalyst and 150 g of crude oil are pre-mixed, homogenized and activated at 230° C. before entering the first stage. Crude oil were placed with catalyst and hydrogen. The reaction occurs at 400° C. with a pressure of 100 Kg/cm² At this early stage, it increases the API gravity of 12.5° to 19° due to the reactions of hydroconversion of asphaltene and resins. Table 10 details their properties.

The output current is sent to the second stage, a fixed bed reactor containing 100 ml of Co—Mo catalyst and a hydrogen stream. The reaction occurs at 350° C., 100 kg/cm² and 0.5 h-1 space velocity. At this stage carried out hydrogenation reactions, hydrocracking, hydrodesulfurization and hydrodenitrogenation. The reaction product of two-stage process is sent to a high pressure separator where the final product is obtained as Gas L. P. Crude oil and enhanced with 27-30° API. Its properties are detailed in Table 10.

TABLE 10

Properties KU-H crude oil, freight and distillate products in two phases with the ionic liquid catalyst and a supported catalyst.

| Properties | | Loading | Stage-1 | Stage-2 |
|---|---|---|---|---|
| Specific Gravity, ° API | | 13.5 | 19.6 | 32.9 |
| Viscosity, cSt | 15.6° C. | 16,273.4 | 84.3 | 8.4 |
| | 25° C. | 5,400 | 59.59 | 6.1 |
| | 37.8° C. | 1,444 | 38.94 | 4.0 |
| Total sulphur, wt % | | 5.14 | 3.7 | 0.85 |
| Total nitrogen, ppm weight | | 750 | 690 | 0.295 |
| Insoluble C₇ wt % | | 26.71 | 12.1 | 1.2 |
| SARA, wt % | Saturates | 12.73 | 18.54 | 42.4 |
| | Polar | 16.81 | 16.64 | 24.6 |
| | Aromatic | 41.81 | 48.43 | 30.3 |
| | Asphaltene | 28.65 | 16.39 | 3.7 |

According to Table 10, the API gravity crude is increased from 12.5 to 19 points in the first stage and viscosities up to 5600-1600 decreased from 60-40 cSt certain to 37.8° C. While in the second stage, you get an upgraded crude oil with 32.9° API, viscosity of 4.0 cSt, reduction in total sulphur content of 0.85 wt % nitrogen and 0.295 ppm by weight, respectively. As a considerable reduction of asphaltenes from 28.65 to 3.7% weight.

The invention claimed is:

1. An ionic liquid catalyst for processing heavy and extra heavy crude oil, wherein said ionic liquid catalyst includes an inorganic salt comprising a Group VIII metal, in the range of 0.3 to 0.7% by weight, and inorganic salts of a Group VIA metal in a range of 0.1 to 0.5% by weight in an aqueous base and where said Group VIA metal is a phosphomolybdate present in the form of a heteropolyacid and has the formula $(PMo_{12}O_{40})^{-3}$.

2. An ionic liquid catalyst for processing heavy and extra heavy crude oil, wherein said ionic liquid catalyst includes ferric sulphate in an amount of 0.3 to 0.7% by weight, and a Group VIA metal salt in an amount of 0.1 to 0.5% by weight in an aqueous base.

3. An ionic liquid catalyst in accordance with claim 1, wherein the inorganic salt of the Group VIA metal is ammonium molybdate, and where said ionic liquid catalyst is activated in a hydrogen atmosphere at a temperature of 200° C. to 350° C.

4. A method of processing heavy and extra heavy crude oil, which consists of: a) adding to an oil field (in situ) the ionic liquid catalyst of claim 2 in concentrations of 0.5 to 10% weight, b) mixing homogeneously; c) pressurized with hydrogen to less than 50 kg/cm², d) increase temperature to 250 to 420° C. and pressure 50 to 125 Kg/cm², for a residence time of reaction 2 to 20 hours for the disintegration of resins and asphaltenes to lower molecular weight hydrocarbons.

5. The method in accordance with claim 4, where the active elements based on Mo, and Fe, are activated in situ at temperatures of 225-275° C.

6. The method in accordance with claim 4, in which the heavy and extra heavy crude oils have API gravity of 4 to 14 degrees and viscosity up to 60,000 cSt @ 25° C.

7. The method in accordance with claim 4, wherein said heavy and extra heavy crude oil increases in API gravity of at least 4 units and up to 10 units and decreases the viscosity of the oil processed to 40 cSt @ 25° C.

8. The method in accordance with claim 4, which increases a distillable fraction of heavy and extra heavy crude oils processed in an amount of at least 18% wt.

9. The method in accordance with claim 4, where the heavy and extra heavy crude oils treated decrease the concentration of asphaltenes contained up to 50% and eliminated 30 to 40% of the sulphur content.

10. A method of processing heavy and extra heavy crude oil using the ionic liquid catalyst in accordance with claim 2, wherein a first stage consists of: a) the ionic liquid catalyst and crude oil are pre-mixed and homogenized in feed pump at a temperature between 200-300° C., before entering a reactor packed with a static switch that contains several elements so mixed assemblies that are between them at an angle of 90°, b) immediately, crude oil and ionic liquid catalyst pre-activated homogenized and mixed with a stream of hydrogen in the temperature range between 350-450° C., so that reactions occur hydrocracking/hydrogenation of asphaltenes and resins at 250-420° C. and pressures from 50 to 125 Kg/cm² for a residence time of reaction 2 to 20 hours, a second step: c) mixing the reaction products of the first phase with a stream of hydrogen to feed a fixed bed reactor packed with a catalyst NiCoMoWP based multimetallic supported on alumina and/or in silico-aluminate, amorphous or crystalline, in concentrations from 5 to 15% by weight a temperature between 250-420° C. and pressures between 50 and 125 Kg/cm² with a residence time of 2 to 30 hours, taking place hydrocracking reactions, hydrodesulfurization and hydrogenation of aromatics, conversion of resins and asphaltenes to lower molecular weight structures.

11. The method in accordance with claim 10, wherein the API gravity crude is increased from 12.5 to 19 points in the first stage and the viscosity decreases from 5600-1600 to 60-40 cSt certain @ 37.8° C., while in the second stage, a crude oil is obtained with API gravity of 32.9°, viscosity of 4.0 cSt, reduction in total sulfur content of 0.85 wt % nitrogen and 295 ppm by weight, respectively, and asphaltenes reduction of 28.65 to 3.7% by weight.

12. The catalyst of claim 1, wherein said catalyst comprises iron and molybdenum.

13. The ionic liquid catalyst of claim 1, wherein said Group VIII metal is ferric sulfate.

14. The ionic liquid catalyst of claim 2, wherein said Group VIA metal salt is a phosphomolybdate having the formula $(PMo_{12}O_{40})^{-3}$.

15. The method of claim 4, wherein said ionic liquid catalyst is present in an amount of 2.0 to 0.1 wt % based on the weight of the crude oil.

16. An ionic liquid catalyst for processing heavy and extra heavy crude oil, wherein said ionic liquid catalyst comprises a Group VIII metal inorganic salt and phosphomolybdate having the formula $(PMo_{12}O_{40})^{-3}$.

17. The ionic liquid catalyst of claim 16, wherein said Group VIII metal inorganic salt is present in an amount of 0.3 to 0.7% by weight, and said phosphomolybdate is present in an amount of 0.1 to 0.5% by weight in an aqueous base.

18. An ionic liquid catalyst for processing heavy and extra heavy crude oil, wherein said ionic liquid catalyst comprises a Group VIII metal inorganic salt and a phosphomolybdate, wherein said Group VIII metal is iron.

19. The ionic liquid catalyst of claim 16, wherein said Group VIII metal is ferric sulfate.

20. A method of processing heavy and extra heavy crude oil, comprising the steps of:
    admixing an ionic liquid catalyst and crude oil at concentration of 0.5 to 10% by weight to obtain a mixture, wherein said ionic liquid catalyst comprises a molybdenum salt and an iron salt in the form of a heteropoly acid, wherein said Group VIII metal salt is ferric sulfate, and
    heating the resulting mixture to a temperature of 250° to 420° C. and pressure 50 to 125 Kg/cm² in the presence of hydrogen, for a time sufficient for the disintegration of resins and asphaltenes to lower molecular weight hydrocarbons.

21. The method of claim 20, wherein said crude oil has an API gravity of 4 to 14 degrees.

22. The method of claim 20, wherein said molybdenum is present in the form of phosphomolybdate having the formula $(PMo_{12}O_{40})^{-3}$.

23. The method of claim 20, further comprising activating said ionic liquid catalyst by pressurizing said ionic liquid catalyst with hydrogen to a pressure less than 50 kg/cm² and heating to a temperature of 200° to 350° C.

* * * * *